United States Patent [19]

Heins et al.

[11] 4,330,597

[45] May 18, 1982

[54] PROCESS FOR DRESSING LEATHER BY A TREATMENT USING RUBBER LATICES

[75] Inventors: Ferdinand Heins, Erkrath; Leo Tork, Leverkusen; Wolfgang Höhne, Bergisch Gladbach, all of Fed. Rep. of Germany

[73] Assignee: Bayer Aktiengesellschaft, Leverkusen, Fed. Rep. of Germany

[21] Appl. No.: 206,069

[22] Filed: Nov. 12, 1980

[30] Foreign Application Priority Data

Nov. 17, 1979 [DE] Fed. Rep. of Germany ....... 2946435

[51] Int. Cl.$^3$ ......................... B05D 3/02; B05D 3/12; B32B 9/02; C14C 9/00

[52] U.S. Cl. ....................................... 428/473; 69/21; 427/370; 427/379; 427/389; 428/540; 525/368; 525/369; 525/373

[58] Field of Search .................... 260/29.7 H, 29.7 M; 525/368, 369, 373; 427/389, 370, 379; 428/473, 540; 69/21

[56] References Cited

U.S. PATENT DOCUMENTS 3,078,247 2/1963 Sihn et al. ....................... 525/373 X

FOREIGN PATENT DOCUMENTS 1126834 9/1968 United Kingdom .......... 260/29.7 H

*Primary Examiner*—Michael R. Lusignan

*Attorney, Agent, or Firm*—Connolly and Hutz

[57] ABSTRACT

Advantages in the dressing of leather, especially of split leather, with a synthetic rubber latex are obtained if in the leather dressing, the rubber latex is reacted with from 0.5 to 50% by weight, based on solid rubber, of one or more oxides and/or hydroxides of one or more bivalent metals and the leather is treated with a non-polymerized rubber latex which is produced in a one-stage process up to a monomer conversion of from 70 to 95% by weight, by emulsion polymerization of:

(A) from 1 to 10 parts by weight of one or more $\alpha,\beta$-monoethylenically unsaturated carboxylic acids; and (B) from 90 to 99 parts by weight of a mixture of
  (a) from 10 to 90 parts by weight of butadiene and
  (b) from 10 to 90 parts by weight of styrene and/or acrylonitrile, wherein the quantity of acrylonitrile in the mixture amounts to a maximum of 50 parts by weight.

7 Claims, No Drawings

PROCESS FOR DRESSING LEATHER BY A TREATMENT USING RUBBER LATICES

The present invention relates to a process for dressing leather using carboxylated rubber latices obtained from conjugated dienes, vinyl aromatics and/or (meth) acrylonitrile by a reaction with oxides and/or hydroxides of bivalent metals.

When dressing fully grained, buffed or split leathers, dressing agents made of pigments and binding agents are applied onto the surface of the leather so that the pores on the surface of the leather are sealed. Aqueous copolymer dispersions are generally used as the binding agent. These copolymer dispersions are polyacrylate dispersions, dispersions of copolymers of vinylacetate with acrylic esters or ethylene or synthetic rubber-dispersions. Those pigments of an inorganic or organic source are used as the pigments, e.g. iron oxide, titanium dioxide, kaolin, azo pigments and phthalocyanins. Apart from these pigments, the dressings may contain conventional thickening agents, e.g. those based on cellulose, such as carboxymethyl cellulose, polyvinyl alcohols, poly-N-vinyl pyrrolidone, polyacrylic acid and the salts thereof and also casein.

The copolymer-dispersions which are usually used are satisfactory when used on fully-grained and buffed leathers, but they are unsatisfactory on split leathers. Dressings on split leathers, particularly for the upper leathers of shoes, when using the copolymer dispersions mentioned above, exhibit a poor grainability and an insufficient fastness, particularly an inadequate dry and wet buckling-resistance, a deficient layer adhesion and a poor flexibility when cold.

It is known that dressings are obtained which have particularly effective dry buckling resistances when a high cross-linking level of the copolymers is set. However, such dressings cannot be easily embossed due to their elasticity, and in a multi-layered method, exhibit a poor layer-adhesion when they are wet and an inadequate wet buckling-resistance.

A process for a hot-pressing resistant dressing for leathers by treating with polymer dispersions containing carboxylic acid groups in the presence of zinc compounds is described in French Pat. No. 1,197,476. By this process, the hot-pressing resistance of the dressing is indeed improved, but the covering, surface smoothness, gloss, fullness and feel are impaired. Adhesion difficulties arise between the individual layers particularly by pressing processes between the individual covering dye applications as a result of cross-linking. The upper layer is not anchored sufficiently onto the lower layer so that a leather is obtained which has a poor wet buckling resistance and poor wet adhesion.

It has now been found that covering layers on leather with particularly desirable characteristics, which are important for the leather dressing, such as sealing and covering, lie of the grain and pliability, flexibility when cold and adhesion, wet and dry rubbing fastness, but particularly very effective wet and dry buckling resistance, an outstanding grainability and layer adhesion are obtained when the leather is treated with carboxylated synthetic rubber latices, in the preparation of which polymerisation is effected up to a conversion of the monomers of from 70 to 95% by weight, preferably from 80 to 90% by weight, and the latices are reacted with oxides and/or hydroxides of bivalent metals for the leather dressing.

Therefore, an object of the invention is a process for dressing leather by a treatment using a synthetic rubber latex, characterised in that in the leather dressing, the rubber latex is reacted with from 0.5 to 50% by weight, based on solid rubber, of one or more oxides and/or hydroxides of bivalent metals and the leather is treated with a non-polymerised rubber latex which is prepared in a one-step process up to a monomer conversion of from 70 to 95% by weight, by emulsion polymerisation of:

(A) from 1 to 10 parts by weight of one or more $\alpha$, $\beta$-monoethylenically unsaturated aliphatic carboxylic acid; and (B) from 90 to 99 parts by weight of a mixture of:

(a) from 10 to 90 parts by weight, preferably from 30 to 70 parts by weight of one or more acyclic conjugated dienes having from 4 to 9 carbon atoms; and (b) from 10 to 90 parts by weight, preferably from 30 to 70 parts by weight of one or more vinyl aromatics having from 8 to 12 carbon atoms and/or (meth) acrylonitrile whereby the quantity of (meth)acrylonitrile in the mixture amounts to a maximum of 50 parts by weight.

In the dressing for the leather, the rubber latex is preferably reacted with from 1 to 20% by weight, based on solid rubber, of one or more oxides and/or hydroxides of bivalent metals.

The following are mentioned by way of example as $\alpha$, $\beta$-monoethylenically unsaturated mono- and dicarboxylic acids: acrylic acid, methacrylic acid, itaconic acid, fumaric acid and maleic acid and also monoesters of these dicarboxylic acids, e.g. monoalkyl itaconate, monoalkyl fumarate and monoalkyl maleate.

The following are suitable acyclic conjugated dienes having from 4 to 9 carbon atoms, e.g.: butadiene-(1,3), 2-methyl butadiene-(1,3) (isoprene), 2,3-dimethyl-butadiene-(1,3), piperylene, 2-neopentyl butadiene-(1,3) and other substituted dienes, for example 2-chlorobutadiene-(1,3) (chloroprene), 2-cyanobutadiene-(1,3) and also substituted straight-chain conjugated pentadienes and straight-chain or branched-chain hexadienes. Butadiene-(1,3) is the preferred monomer as it is able to copolymerise particularly effectively with vinyl aromatics and (meth)acrylonitrile.

Vinyl aromatics which are suitable are those in which the vinyl group is directly linked to a nucleus consisting of from 6 to 10 carbon atoms. The following are mentioned by way of example: styrene and substituted styrenes such as 4-methyl styrene, 3-methyl styrene, 2,4-dimethyl styrene, 4-isopropyl styrene, 4-chloro styrene, 2,4-dichloro styrene, divinyl benzene, $\alpha$-methyl styrene and vinyl naphthalene. Styrene is the preferred monomer due to its accessibility and because it is able to copolymerise in an outstanding manner particularly with butadiene-(1,3).

As much as 25 parts by weight of the water-insoluble monomers may be replaced by one or more copolymerisable monomers, particularly by (meth)acrylic acid alkyl-ester, e.g. methyl-, ethyl-, n-propyl-, isopropyl-, n-butyl-, isobutyl and 2-ethylhexyl-(meth)acrylate, mono- and diesters from alkanediols and $\alpha$, $\beta$-mono ethylenically unsaturatee monocarboxylic acids such as ethylene-glycol-mono(meth)acrylate, propyleneglycol-mono(meth)acrylate, ethyleneglycol-di-(meth)acrylate, butanediol-1,4-di-(meth)-acrylate, amides $\alpha$, $\beta$-monoethylenically unsaturated mono- and dicarboxylic acids such as acrylamide and methacrylamide amide and the N-methylol compounds thereof and also N-alkoxymethyl- and N-acyl-(meth)acrylic amides having from 1 to 4 carbon atoms in the alkyl groups, e.g. N-methoxy-methyl-(meth)acrylamide, N-n-butoxymethyl (meth) acrylamide and N-acetoxymethyl-(meth) acrylamide. Monomers carrying sulphonic acid groups are also suitable, e.g. styrene sulphonic acid, (meth) allyl sulphonic acid or the water-soluble salts thereof. Vinyl esters of carboxylic acids having from 1 to 18 carbon atoms are included as other comonomers, particularly vinyl acetate and vinyl propionate, vinyl chloride and vinylidene chloride, vinyl ether such as vinyl methyl ether, vinyl ketones such as vinyl ethyl ketone and heterocyclic mono vinyl compounds such as vinyl pyridine.

The synthetic rubber latices which are suitable for the leather dressing process of the invention are prepared by a one-step emulsion polymerisation (batch-polymerisation) at temperatures of between 0° C. and 60° C. and pH-values of between 2 and 12. For this purpose, anionogenic, cationogenic or non-ionogenic emulsifiers and dispersing agents or combinations thereof are used in a quantity of from 0.5 to 20% by weight (based on monomers).

Examples of anionigenic emulsifiers are salts of high fatty acids and resin acids, higher fat alcohol sulphates, higher alkyl sulphonates and alkyl aryl sulphonates and also the condensation products thereof with formaldehyde, higher hydroxyalkyl sulphonates, salts of sulphosuccinic esters and sulphated ethylene oxide adducts.

Examples of cationogenic emulsifiers are salts of alkyl, aryl and alkyl aryl amines with inorganic acids, salts of quaternary ammonium compounds and also alkyl pyridinium-salts.

As non-ionogenic emulsifiers, there may be used, e.g. the known reaction products of ethylene oxide with fat alcohols e.g. lauryl, myristyl, cetyl, stearyl and oleyl alcohol, with fatty acids such as lauric acid, myristic acid, palmitic acid, stearic acid and oleic acid and also the amides and alkyl phenols thereof such as isoocytyl phenol, isononyl phenol and dodecyl phenol. Further examples are the reaction products of ethylene oxide with isononyl mercaptan, dodecyl mercaptan, tetra decyl mercaptan and higher alkyl mercaptans and higher alkyl thiophenols or analogous reaction products of etherified or esterified polyhydroxy compound with a longer alkyl chain such as sorbitol monostearate. The compounds which have been mentioned as examples are reacted in each case with from 4 to 60 or more mols of ethylene oxide. However, block-copolymers of ethylene oxide and propylene oxide with at least one mol of ethylene oxide may also be used in this case.

The following are suitable as initiators, e.g. inorganic peroxo compounds such as hydrogen peroxide, sodium, potassium or ammonium peroxodisulphate, peroxocarbonates and borate peroxy hydrates, also organic peroxocompounds such as acyl hydroperoxides, diacyl peroxides, alkyl hydroperoxides, dialkyl peroxides and esters such as tert.-butyl perbenzoate. The initiator is generally used in a quantity within the range of from 0.05 to 5% by weight, based on the total quantity of the monomers which are used.

The inorganic or organic peroxo compounds which were stated as examples may also be used combined with suitable reducing agents in a known manner. The following are mentioned as examples of such reducing agents: sulphur dioxide alkali disulphites, alkali and ammonium hydrogen sulphites, thiosulphate, dithionite and formaldehyde sulphoxylate, also hydroxylamine hydrochloride, hydrazine sulphate, iron (II)-sulphate, tin (II)-chloride, titanium (III)-sulphate, hydroquinone, glucose, ascorbic acid and certain amines.

It is often advisable for polymerisation to be carried out in the presence of promoters. The following are suitable as such, e.g. small quantities of metal salts whose cations may exist in more than one valency stage. Examples are: copper, manganese, iron, cobalt and nickel salts.

It is occasionally advisable to carry out the emulsion polymerisation in the presence of buffer substances, chelation agents and similar additives. The skilled man knows the nature and quantity thereof.

Chain transfer agents, e.g. tetrabromo methane, tetrabromo ethane, lower and higher alcohols, higher alkyl mercaptans and dialkyl dixanthates may also be used in the polymerisation. The nature and quantity of the chain transfer agents depend among other things on the effectiveness of the chain transfer agent and on the quantity of the diene which is used. Therefore, a particular significance is attributed to the selection and quantity of the chain transfer agent because as a result of this, the layer adhesion of the leather dressings produced from the rubber latices and also their buckling-resistance when wet and dry may be optimised within certain limits.

Particularly high buckling resistances of the dressings when wet and dry can only be achieved however when polymerisation of the synthetic rubber latices according to the invention with a conversion of the monomers of from 70 to 95% is interrupted by adding a chain-terminating agent.

Suitable chain terminating agents are, for example, sodium dimethyl dithiocarbamate, hydroxylamine, dialkyl hydroxylamine, hydrazine hydrate and hydroquinone.

After polymerisation has been terminated, the latex is released from the remaining monomers in a known manner.

Thus, latices may be produced having a solids content of between 1 and 65% by weight. Usually however, latices having a solids content of between 30 and 50% by weight are used.

The synthetic rubber latices according to the invention are unsuitable per se for dressing leather, but lead to outstanding advantages in terms of use when combined with oxides and/or hydroxides of bivalent metals, which react with the carboxyl groups of the copolymers.

Suitable oxides of bivalent metals are for example barium, magnesium, calcium and zinc oxides, whereby the latter are particularly preferred. These oxides are obtained by calcining the corresponding finely-distributed carbonates.

The corresponding hydroxides may be precipitated from aqueous solutions of the corresponding salts by adding alkali or they may be obtained by reacting the oxides with water.

Accordingly, the leather may also be dressed such that aqueous solutions of the bivalent metals are used and the corresponding hydroxides are produced in situ by adding alkali.

In order to obtain an improved wetting and dispersion, the oxides or hydroxides of the bivalent metals are generally supplied with approximately from 20 to 60% of their weight of wetting agents, preferably of the non-ionogenic type. Organic solvents such as alcohols e.g. methyl, ethyl, n-propyl and isopropyl alcohol or ethylene glycol monoethyl ether or ketones such as acetone and methyl ethyl ketone, natural or synthetic oils, such as neat's foot oil, arachis oil or Turkey red oil in free and/or emulsified form and also suitable descumming agents may also be added advantageously to the oxides and/or hydroxides of bivalent metals. These mixtures are preferably used in the form of pastes for the process of the invention.

When dressing the leather, conventional covering dye pastes may also be used.

Processing may be effected on fully-grained, buffed and split leathers or leather fibrous materials of any source. The dressings are applied onto the leather in known manner, using the copolymer-latices, according to the invention, pigment preparations of the above-mentioned type and also other additives. The dressings may be applied by means of pouring, doctor, coating, spraying, brushing or plush processes. The quantity of the dressing depends on the nature and pre-treatment of the leather and may be easily determined by preliminary experiments.

Impregnation is effected in one or more applications. As a result of a hot, heavy intermediate pressing or grain-embossing, an effective melt is achieved and thereby a successful sealing of the impregnation. An upper covering dye application using the same liquor may then be carried out.

By adding thickening agents of the type mentioned at the outset, the viscosity of the rubber latices may be controlled so that the penetration ability may be slightly redued via the rise in viscosity. The thickened rubber latices are particularly suitable for dressing split leather due to the higher filling effect conditioned thereby and the improved film forming ability.

Polyurethane lacquer, collodion lacquer or collodion lacquer emulsions of the oil-in-water and water-in-oil-type and also aqueous polyacrylate dispersions or polyurethane dispersions which are applied by means of spraying and pouring processes are suitable as a sealing finish on the leathers which have been dressed according to the invention.

The advantages of the dressing process according to the invention may be summarized as follows: a rational method in a purely aqueous phase using only one dye liquor with the application of conventional plush, spraying or pouring processes, rapid drying, outstanding grainability of the dressing, no stickiness when ironing, embossing or stacking, excellent wet and dry buckling resistance, effective flexibility when cold, very effective chafing-resistance and adhesion from layer to layer and also excellent sorting results through a good fullness.

The following Examples explain the process according to the invention. The stated parts and percentages always relate to weight.

1. PREPARATION OF THE RUBBER LATICES

Latex A

A mixture of 18,000 g of water, 5000 g of butadiene(1,3), 3000 g of acrylonitrile, 1700 g of styrene, 333 g of 90% methyacrylic acid and 50 g of tert.-dodecyl mercaptan in the presence 200 g of a sodium sulphonate of a mixture of long chain paraffin hydrocarbons having an average chain length of 15 carbon atoms as the emulsifier and 5 g of 70% tert.-butyl hydroperoxide and 2.5 g of sodium formaldehyde sulphoxylate dihydrate (Romgalite C) as the Redox initiator system is polymerised at 35° C. in a 40 liter autoclave made of stainless steel and equipped with a cross beam stirrer, until a solid content of 20% is obtained. A solution of 100 g of a reaction product of isononyl phenol with 20 mols of ethylene oxide and 2.5 g of Rongalite C in 500 g of water is then added by pressure and further polymerised at 35° C. After obtaining a solid substance concentration of approximately 31% (an approximate 86% conversion), the polymerisation is stopped using a solution of 200 g of 25% diethyl hydroxylamine in 200 g of water. The latex A which is obtained is released from the remaining monomers and has a solid concentration of 31%.

Latex B

The experiment described in Example 1 is repeated, but the sodium paraffin sulphonate which was used as the emulsifier is replaced by the same quantity of sodium lauryl sulphate. After obtaining a solid concentration of approximately 28% (an approximate 77% conversion), polymerisation is interrupted using a solution of 200 g of 25% diethyl hydroxylamine in 200 g of water. The latex B which is obtained is released from the remaining monomers and has a solid concentration of 28%.

Latex C

A mixture of 18000 g of water, 500 g of butadiene-(1,3), 3000 g of acrylonitrile, 1900 g of styrene, 100 g of itaconic acid and 50 g of tert.-dodecyl mercaptan is polymerised using 200 g of a sodium sulphonate of a mixture of long chain paraffin hydrocarbons having an average chain length of 15 carbon atoms as the emulsifier and 5 g of 70% tert.-butyl hydroperoxide and 2.5 g of sodium formaldehyde sulphoxylate (Rongalite C) as the initiator system in a 40 liter autoclave made of stainless steel and equipped with a cross beam stirrer. Polymerisation is carried out at 35° C. until a solid content of 20% is obtained. Thereafter, a solution of 100 g of 20-fold oxethylated isononyl phenol and 2.5 g of Rongalite C in 500 g of water are added and polymerisation is continued at the same temperature until a solid concentration of approximately 29% is obtained. The reaction is then stopped using a solution of 200 g of 25% diethyl hydroxylamine in 200 g of water and the latex is removed from the remaining monomers. The solid concentration of the obtained latex C is 29% (an approximate 80% conversion).

2. PREPARATION OF THE CROSS-LINKER PASTES

In order to carry out the dressing process according to the invention, so-called cross-linker pastes are used in addition to the dye pastes which are usually used. The preparation of these cross-linker pastes is described in the following, by way of example.

Paste A 47 parts of water, 2 parts of 25% aqueous ammonia solution and 8 parts of ethylene glycol monoethyl ether are added with stirring to 10 parts of a 30% aqueous copolymer dispersion of 73% acrylic acid ethyl ester and 27% of acrylic acid. The clear mixture which is obtained has a pH of approximately 8 and is then mixed with 33 parts of a dispersion of zinc oxide in oil emulsion which is described in the following. The total mixture (100 parts) is then ground once on a ball mill.

Preparation of the zinc oxide dispersion:

8 parts of zinc oxide, obtained by calcining fine zinc carbonate, are introduced into 16 parts of an aqueous neat's foot oil emulsion, prepared by emulsifying crude neat's foot oil in the same parts of water using a non-ionogenic alkyl polyglycol ether at 90° C. in the course of 10 minutes with a high-speed stirrer, 6 parts of 50% aqueous Turkey red oil-solution and 3 parts of an addition product of approximately 20 mols of ethylene oxide to 1 mol of benzyl phenyl phenol.

When the zinc oxide has been introduced, the mixture is thoroughly stirred for another 15 minutes.

Paste B 20 parts of neat's foot oil are emulsified at 80° C. in 15 parts of a vinyl pyrrolidone copolymer and 1 part of an addition product of approximately 30 mols of ethylene oxide to 1 mol of isononyl phenol by means of a high-speed stirrer. 49 parts of water and 15 parts of pulverised magnesium hydroxide are added with further stirring.

When the magnesium hydroxide has been introduced, the mixture is thoroughly stirred for a further 15 minutes. The total mixture (100 parts) is then ground once on a ball mill.

3. DRESSING THE LEATHER

EXAMPLE 1

For dressing vegetably retanned split leathers or buffed vachettes, 100 parts of a conventional pigment paste based on casein are stirred with 100 parts of paste A. 300 parts of water are added to this mixture with stirring and finally 500 parts of latex A. The viscosity of the dye liquor corresponds to an outflow time of from 16 to 20 seconds in the Ford Viscosimeter with a 4 mm nozzle.

The split leathers or buffed vachettes to be treated receive one to two coats by means of a brush, a plush board, an airless gun, a spraying or pouring machine. The coating quantity is altogether approximately from 150 to 300 $g/m^2$. After drying, the leathers are ironed or grain-embossed at 100° C. and 350 bars with a delay of from 2 to 5 seconds. The upper covering dye application is then carried out using the same liquor (application approximately from 100 to 200 $g/m^2$). For sealing, a conventional collodion lacquer as the finish is applied by a spraying or pouring application.

The dressing which is obtained has the advantageous characteristics which are stated in the description.

EXAMPLE 2

The dressing of vegetably retanned split leathers or buffed vachettes is effected using a highly concentrated liquor. 200 parts of a conventional pigment paste based on casein are stirred with 60 parts of paste B. 40 parts of water and then 700 parts of latex B are added to this mixture. The viscosity of the dye liquor corresponds to an outflow time of from 20 to 35 seconds in the Ford viscosimeter with a 4 mm nozzle. The dressing is effected as described in Example 1.

The characteristics in terms of use of the dressing correspond to the advantageous characteristics described hereinbefore.

EXAMPLE 3

For the dressing of fully grained nappa leather for upholstered furniture, 100 parts of a conventional pigment paste based on casein are stirred with 60 parts by weight of paste A. 540 parts of water are added to this mixture with stirring and finally 300 parts of latex C. The nappa leathers which are to be treated receive 1 to 2 coats by means of a plush board, an air spray or airless gun. After drying, the leathers are ironed at 70° C. and 150 bars. The nappa leathers are then milled for 1 to 2 hours in the tank. The upper covering dye application is then effected using the same liquor by 1 to 2 spray coatings using an air or airless gun. A conventional collodion lacquer or a lacquer based on polyurethane as the sealing is then applied by a spray coating.

The dressed leathers have a good appearance and high physical fastnesses, particularly wet and dry buckling resistances, wet rubbing fastnesses and cold flexibility. They are very mill fast; even with a relatively thick covering, the leathers become pleasantly soft and do not appear overloaded. The grain standard is fine, the grain path and lie of the grain are elegant. The streaks are small.

What we claim is:

1. A process for dressing leather with a synthetic rubber latex which is reacted with from 0.5 to 50% by weight, based on solid rubber, of one or more oxides and/or hydroxides of one or more bivalent metals and also treating the leather with a non-polymerized rubber latex which is produced in a one-stage process up to a monomer conversion of from 70 to 95% by weight, by emulsion polymerization of:

(A) from 1 to 10 parts by weight of one or more $\alpha, \beta$ mono-ethylenically unsaturated aliphatic carboxylic acids; and ethylenically unsaturated aliphatic carboxylic acids; and (B) from 90 to 99 parts by weight of a mixture of:

(a) from 10 to 90 parts by weight of butadiene (b) from 10 to 90 parts by weight of styrene and/or acrylonitrile, whereby the quantity of acrylonitrile in the mixture amounts to a maximum of 50 parts by weight.

2. A process according to claim 1, comprising that the rubber latex is reacted with from 1 to 20% by weight, based on solid rubber, of one or more oxides and/or hydroxides of one or more bivalent metals.

3. A process according to claim 1, wherein the leather is treated with a rubber latex which is produced by polymerisation up to a monomer conversion of from 80 to 90% by weight.

4. A process according to claim 1, wherein up to 25 parts by weight of water-insoluble monomers polymerised in the rubber are replaced by other copolymerisable monomers.

5. A process according to claim 1, wherein the leather is treated with a rubber latex and a paste which comprises a mixture of one or more metal oxides and/or metal hydroxides and one or more wetting agents.

6. A process according to claim 1, wherein polymerisation of the synthetic rubber latex is interrupted by addition of a chain-terminating agent.

7. A process according to claim 6, wherein the chain-terminating agent is sodium dimethyl dithiocarbonate, hydroxylamine, dialkyl hydroxylamine, hydrazine hydrate or hydroquinone.

* * * * *